(12) United States Patent
Kang et al.

(10) Patent No.: US 7,154,948 B2
(45) Date of Patent: Dec. 26, 2006

(54) VIDEO CODEC SYSTEM, METHOD FOR PROCESSING DATA BETWEEN SYSTEM AND HOST SYSTEM, AND ENCODING/DECODING CONTROL METHOD IN THE SYSTEM

(75) Inventors: Sang-ug Kang, Seoul (KR); Byung-sun Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 904 days.

(21) Appl. No.: 09/771,632

(22) Filed: Jan. 30, 2001

(65) Prior Publication Data

US 2002/0037036 A1    Mar. 28, 2002

Related U.S. Application Data

(60) Provisional application No. 60/216,527, filed on Jul. 6, 2000.

(30) Foreign Application Priority Data

Sep. 27, 2000 (KR) ............... 2000-56606

(51) Int. Cl.
*H04N 7/12* (2006.01)
*H04B 1/66* (2006.01)

(52) U.S. Cl. ............... 375/240.01; 348/419.1

(58) Field of Classification Search ......... 375/240.01, 375/240.02, 240.1, 240.16; 370/276, 278; 712/1; 348/419.1
See application file for complete search history.

(56) References Cited

U.S. PATENT DOCUMENTS 5,010,401 A * 4/1991 Murakami et al. ..... 375/240.16

5,289,577 A    2/1994 Gonzales et al.
5,781,788 A * 7/1998 Woo et al. ............. 712/1

FOREIGN PATENT DOCUMENTS

| JP | 9-18871 A | 1/1997 |
|---|---|---|
| JP | 10-135842 A | 5/1998 |
| JP | 11-85969 A | 3/1999 |

OTHER PUBLICATIONS

Hirokazu Suzuki, et al. Development of High Performance Video Processor Core Architecture-Overall Architecture-, Proceedings of the 2000 IEICE General Conference, Mar. 28-31, 2000, Hiroshima University, Higashi-Hiroshima, The Institute of Electronics, Information and Communication Engineers.

* cited by examiner

*Primary Examiner*—Gims Philippe
(74) *Attorney, Agent, or Firm*—Sughrue Mion, PLLC

(57) ABSTRACT

A video codec system, a data processing method for processing data between the system and an external host system, and an encoding/decoding control method in the system are provided. The video codec system includes an encoder buffer; a decoder buffer; a task status register for writing the task statuses of the encoder, decoder, encoder buffer and decoder buffer; a command identification register for writing a command to be executed by the encoder and decoder; and an interface and control manager for parsing the command sent from the host system, writing the command in the command identification register, checking each task through the task status register, and then controlling the encoder and decoder through the command identification register. Therefore, the video codec system enhances the performance and reliability of the video code and makes the control of the encoding and decoding tasks easier.

1 Claim, 4 Drawing Sheets

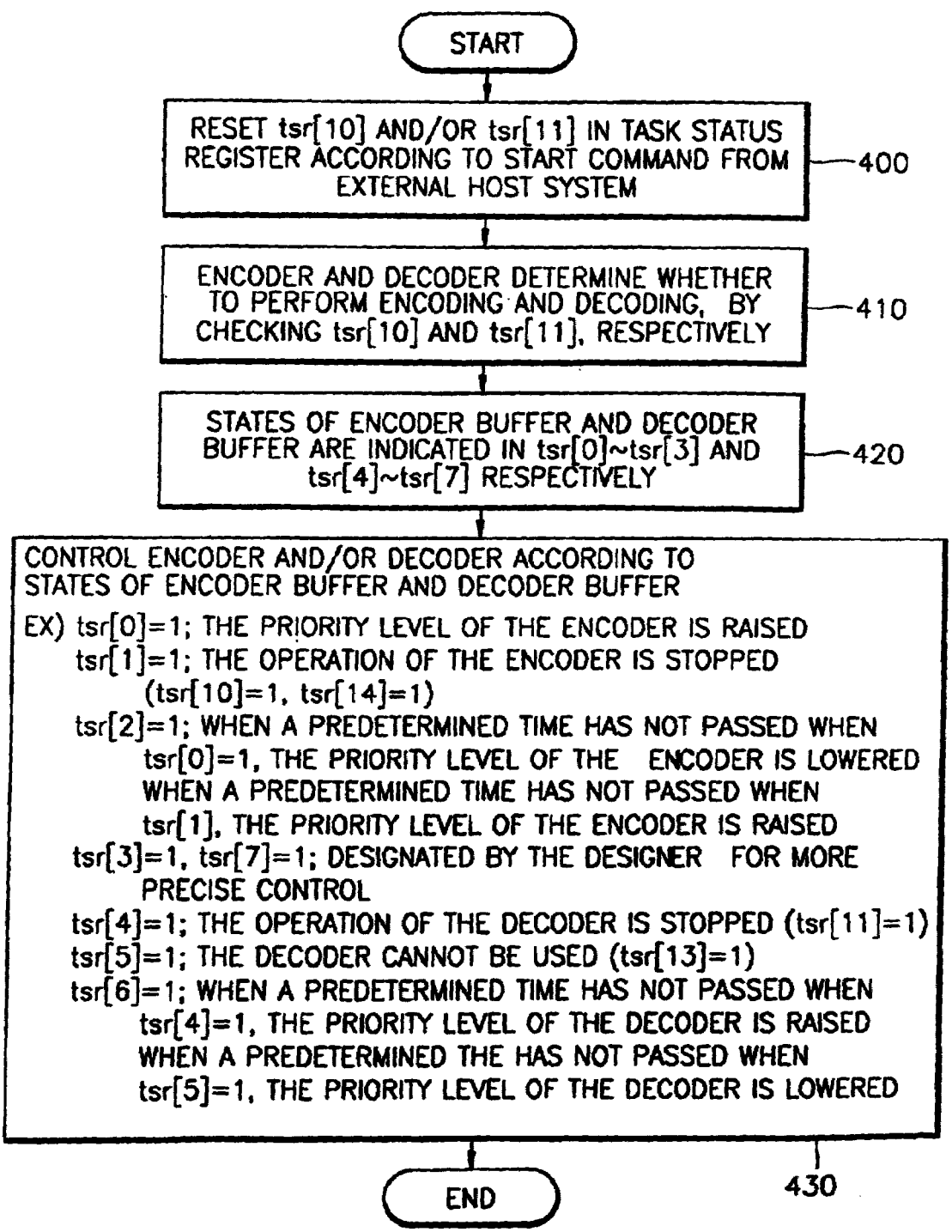

VIDEO CODEC SYSTEM, METHOD FOR PROCESSING DATA BETWEEN SYSTEM AND HOST SYSTEM, AND ENCODING/DECODING CONTROL METHOD IN THE SYSTEM

The present application is based on Korean Patent Application No. 00-56606 and U.S. Provisional Application No. 60/216,527, which are incorporated herein by reference.

BACKGROUND OF THE INVENTION

1. Field of the Invention

The present invention relates to a video codec, and more particularly, to a video codec system which is implemented in a processor independent from a host system, a method for processing data between the video codec system and an external host system, and a method for controlling encoding/decoding in the video codec system.

2. Description of the Related Art

Generally, a video codec includes an encoder and a decoder, and performs encoding and decoding in a system which needs the video codec. Also, the video codec receives data to be encoded and then sends the encoded result, or the video codec receives encoded data and then sends the decoded result. That is, the conventional video codec performs encoding/decoding simply according to the commands of a system.

Therefore, when a video codec is implemented as an independent processor in a multimedia communication system, it is required to appropriately process transmitting and receiving data between the multimedia communication system and the video codec, in the video codec, and a video codec structure appropriate to this is required.

SUMMARY OF THE INVENTION

To solve the above problems, it is an object of the present invention to provide a video codec system which is implemented in a processor independent from a host system and includes elements for effectively performing encoding and decoding so that the performance of the video codec can be enhanced.

It is another object to provide a method for appropriately processing data between a video codec system, which is implemented in a processor independent from a host system, and the host system.

It is another object to provide a method for controlling encoding/decoding in a video codec system which is implemented in a processor independent from a host.

To accomplish the above object of the present invention, there is provided a video codec system which is implemented in a processor independent from a host system and includes an encoder for encoding video data input through a video input apparatus and a decoder for decoding the encoded data sent from the host system and outputting the decoded data to a video output apparatus. The video codec system comprises an encoder buffer for temporarily storing the bit stream encoded in the encoder, before the bit stream is sent to the host system; a decoder buffer for temporarily storing the encoded data sent from the host system; a task status register for writing the task statuses of the encoder, decoder, encoder buffer and decoder buffer, in the form of predetermined bits; a command identification register for writing a command to be executed by the encoder and decoder; and an interface and control manager for parsing the command sent from the host system, writing the command in the command identification register, checking each task through the task status register, and then controlling the encoder and decoder through the command identification register.

To accomplish another object of the present invention, there is also provided a data processing method for processing data between a video codec system, which is implemented in a processor independent from a host system, and the host system, the data processing method including the steps of: (a) determining whether data input from an external host system is a control command or transmitting data; (b) checking whether or not a set of commands is completed when the input data is a control command, and accumulating the control command when the set of commands are not completed, and then performing the step (a), and writing commands to be executed in the pre-assigned bits of the command identification register when the set of commands are completed; (c) making the other pre-assigned bit of the command identification register indicate that commands to be executed by the encoder and/or decoder exist; and (d) checking the content indicated in the step (c) and then fetching the command written in the step (b) in encoder and/or decoder.

To accomplish another object of the present invention, there is also provided an encoding/decoding control method in a video codec system which is implemented in a processor independent from a host system, the encoding/decoding control method including the steps of: (a) resetting pre-assigned bits of a task status register in the video codec system so that an encoder and/or decoder can operate when a start command is input from the host system; (b) determining whether or not to perform encoding and/or decoding, by checking the reset of the task status register in the encoder and/or decoder; (c) making pre-assigned bits of the task status register indicate the buffer statuses of the encoder buffer and decoder buffer in encoder buffer and decoder buffer; and (d) checking the statuses of the encoder buffer and decoder buffer written in the task status register, and then controlling the tasks of the encoder and decoder.

BRIEF DESCRIPTION OF THE DRAWINGS

The above objects and advantages of the present invention will become more apparent by describing in detail a preferred embodiment thereof with reference to the attached drawings in which:

FIG. 4 is a flowchart for explaining a method for controlling encoding/decoding in the video codec system.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
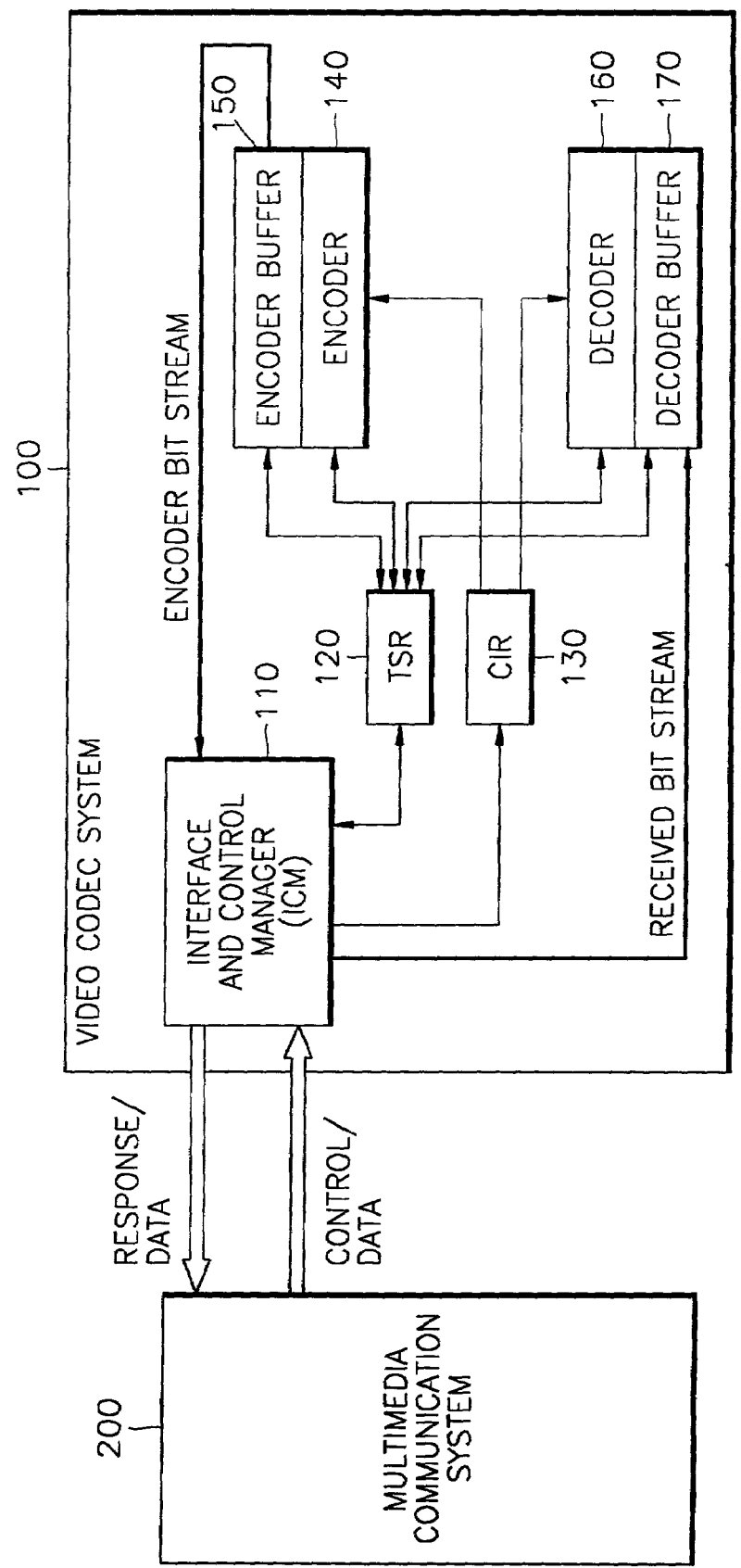
FIG. 1 is a block diagram for explaining the internal structure of a video codec system according to the present invention.

FIG. 1 is a block diagram for explaining the internal structure of a video codec system according to the present invention. The video codec system includes an interface and control manager (ICM) 110, a task status register (TSR) 120, a command identification register (CIR) 130, an encoder 140, an encoder buffer 150, a decoder 160, and a decoder buffer 170.

The ICM 110 receives control commands or transmitting data from a multimedia communication system 200, which is a host system outside the video codec system 100, or sends a response or data to the system 200, using register files. Also, the ICM 110 controls tasks of the encoder 140 and the decoder 160, referring to the TSR 120 or control commands from the multimedia communication system 200. Parsing a control command, the ICM 110 sends the parsed command to the encoder 140 and decoder 160 through the CIR 130, and gives a notice on the result to the multimedia communication system 200, if necessary.

The encoder buffer 150 is a place for temporary storage to send a bit stream, which is encoded in the encoder 140, to the external host system. The encoder buffer 150 shows the buffer statuses, such as an empty level, a full level, a half level, and a user-defined level, before and after receiving an input from the encoder 140. At this time, when the status of the encoder buffer is not in a condition for receiving an input, the operation of the encoder stops.

The decoder buffer 170 is a place for temporary storage for decoding a bit stream, which is encoded in the external host system and sent therefrom. Similar to the encoder buffer 150, the decoder buffer 170 shows the statuses of the buffer before and after receiving an input. Also, when the status of the decoder buffer is not in a condition for receiving an input, the encoded bit stream cannot be recorded.

The TSR 120 is for effectively encoding and decoding an encoded bit stream, which is transmitting data input from the external host system, and data to be encoded, which is input to the encoder 140 through a video input apparatus (not shown). More specifically, the statuses of the encoder 140, encoder buffer 150, decoder 160, and decoder buffer 170 are written in predetermined bits for managing buffers. The ICM 110 checks through the TSR 120 whether or not prerequisites are satisfied when each task executes a job related to other tasks.

That is, the encoder 140 and decoder 160 are controlled according to the statuses of tasks stored in the TSR 120. An example of a TSR 120 format is as follows.

tsr[0]: Set if the encoder buffer is empty. Otherwise reset.
tsr[1]: Set if the encoder buffer is full. Otherwise reset.
tsr[2]: Set if the encoder buffer level is equal to or above half.

Otherwise reset.

tsr[3]: Set if the encoder buffer level is equal to or above the designated level set by the user.
tsr[4]: Set if the decoder buffer is empty. Otherwise reset.
tsr[5]: Set if the decoder buffer is full. Otherwise reset.
tsr[6]: Set if the decoder buffer level is equal to or above half.

Otherwise reset.

tsr[7]: Set if the decoder buffer level is equal to or above the designated level set by the user.
tsr[8]: If set, encoder is masked. Updated by the encoder.
tsr[9]: If set, decoder is masked. Updated by the decoder.
tsr[10]: If set, encoding is not allowed. Update by the ICM. If reset, the encoder can be processed if needed.
tsr[11]: If set, decoding is not allowed. Updated by the ICM. If reset, the decoder can be processed if needed.
tsr[12]: If set, encoder buffer is masked. ICM has no read-access to the encoder buffer. Updated by the encoder buffer.
tsr[13]: If set, decoder buffer is masked. ICM has no write-access to the decoder buffer. Updated by the decoder buffer.
tsr[14]: If set, encoder buffer is not allowed. The encoder cannot write to the encoder buffer. Updated by the ICM.
tsr[15]: If set, decoder buffer is not allowed. The decoder cannot read from the decoder buffer. Updated by the ICM.
tsr[16]: Global mask. If set, all functions are disabled.

Next, when the ICM 110 needs to make the encoder 140 and decoder 160 execute commands, corresponding commands are written in the command identification register (CIR) 130. The encoder 140 and decoder 160, when they do not perform respective jobs, check the presence of commands through the CIR 130 to perform commands. An example of a CIR format is as follows.

cir[0]: If set, the encoder has more than one command to be performed. The number of commands is indicated in cir[2:4].
cir[1]: If set, the decoder has more than one command to be performed. The number of commands is indicated in cir[5:7].
cir[2:4]: The encoder should perform the commands as many times as the number in these bits. The contents of the commands can be read in the argument table designated by a table address variable.
cir[5:7]: The decoder should perform the commands as many times as the number in these bits. The contents of the commands can be read in the argument table designated by a table address variable.
cir[8]: Set after the encoder fetches all the commands in the argument table.
cir[9]: Set after the decoder fetches all the commands in the argument table.

Referring to FIG. 1, H.323 and H.324 can be applied as the multimedia communication system 200, and H.261, H.263, MPEG-2, and MPEG-4 can be applied as a video codec having the encoder 140 and the decoder 160. The multimedia communication system 200 communicates data with external devices via wired or wireless channels. The multimedia communication system 200 sends video-related data, required control commands, and user inputs to the video codec system 100, and receives encoded video data or a response to each control command when necessary.

Figure 2:
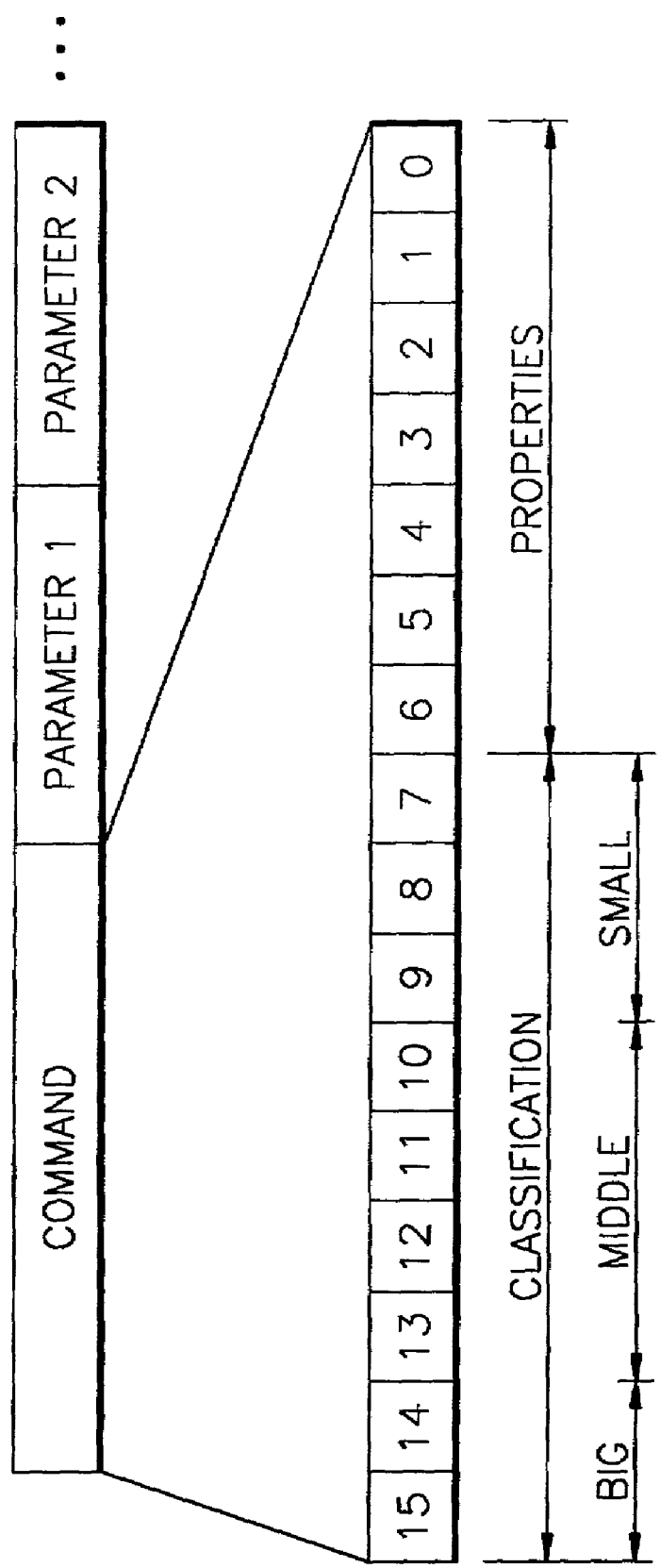
FIG. 2 is an example of the format of a command sent from an external host system to the video codec system.

An example of the format of a command which is sent from the multimedia communication system 200 to the video codec system 100 is shown in FIG. 2. Referring to FIG. 2, a command is divided into an actual command part and parameter parts. The highest bits 15~7 in the two bytes which are a command part indicate the classification of the command, and the remaining bits 6~0 indicate the properties of the command.

More specifically, first, a code is generated according to the command classification. For example, the command classification can include com_reg[9:7] for a small classification, com_reg[13:10] for a middle classification, and com_reg[15:14] for a bid classification. Here, com_reg[15:14] can indicate, for example, reservation bits for debugging commands when '00'; commands related to the encoder when '01'; commands related to the decoder when '10'; and commands related to the encoder and decoder, or other modules when '11'. Also, com_reg[3:10] can indicate, for example, commands related to detailed functions of elements forming the encoder and decoder, and com_reg[9:7] can indicate, for example, commands related to more detailed functions.

Next, a code is generated according to properties of the command.

com_reg[0]: Whether or not a response corresponding to the command is required. When the end flag is '0', the response is on whether or not a command is normally received, and when the end flag is '1', the response is on whether or not a command(s) to be performed is normally performed.

com_reg[1]: Whether or not a set of commands is completed.

1: Accumulated commands are performed. 0: The set of commands is not completed.

com_reg[3:2]: Whether or not a parameter follows a command, and the number of parameters.

00: Parameters are not required

01: A predetermined-byte parameter follows the command.

10: In addition to '01', a predetermined-byte parameter follows the command.

com_reg[4]: Whether a function corresponding to the command is on or off.

1: On, 0: Off.

com_reg[5]: Whether a response is an acknowledgment (ACK) or negative-acknowledgment (NAK)

1: ACK, 0: NAK com_reg[6]: Whether the command is a command sent from the host to the codec or a response to the command sent from the host to the codec.

Figure 3:
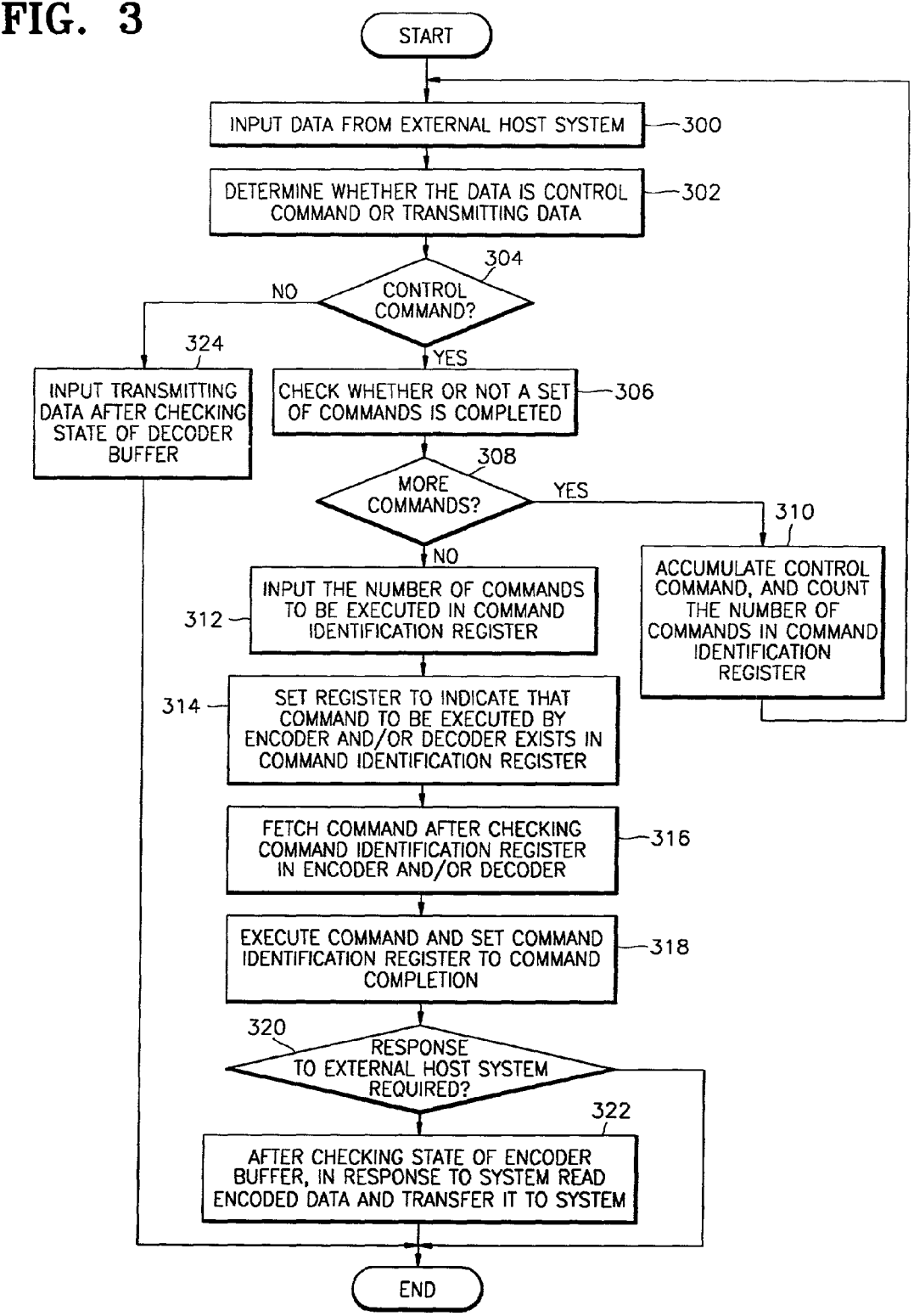
FIG. 3 is a flowchart for explaining a method for processing data between the video code system and the external host system.

FIG. 3 is a flowchart for explaining a method for processing data between the video code system and the external host system. The external host system sends a start command for starting the operations of the encoder and decoder, to the ICM 110. The operations in the video codec system for performing tasks of the encoder and decoder after the start command is sent will now be explained.

Referring to FIG. 3, first, the ICM 110 receives data from the external host system in step 300. Whether the received data is a control command or transmitting data is determined in step 302. For example, 1-bit for distinguishing between a control command and transmitting data is added to the header (not shown) of the command format shown in FIG. 2. When the received data is transmitting data, the transmitting data is sent together with an identification bit instead of the command format shown in FIG. 2.

Whether or not the received data is a control command is determined in step 304. When the received data is a control command, whether or not a set of commands is completed is determined in step 306. Whether or not following commands of the set exist is determined in step 308. When the following commands of the set exist, control commands are accumulated in step 310. That is, the number of commands is counted and written in cir[2:4] and/or cir[5:7] in the CIR 130.

After the step 310, the step 300 is performed again. That is, until the value of com_reg[1] is '1', the above steps are repeated.

When it is determined, in the step 308, that the following commands of the set do not exist, that is, when the set of commands is completed, the number of commands to be performed is written in cir[2:4] and/or cir[5:7] of the CIR 130 in step 312. The number of commands indicates the result of accumulation of commands in the step 310. Then, the CIR 130 shows that commands to be performed by the encoder 140 and/or the decoder 160 exist in step 314. That is, cir[0] and/or cir[1] are set to '1'. This is the process in which a command is parsed in the ICM 110 and the parsed result is written in the corresponding bits of the CIR 130.

Next, the encoder 140 and/or decoder 160 checks the CIR 130 and fetch commands in step 316. More specifically, after encoding one frame of data, the encoder 140 checks cir[0] and fetches a command in cir[2:4], or after decoding one frame of data, the encoder 160 checks cir[1] and fetches a command in cir[5:7]. Then, the encoder 140 and/or decoder 160 performs the command, that is, performs encoding and/or decoding, and shows that all commands have been fetched in step 318. That is, cir[8] and/or cir[9] is set to indicate that commands have been performed.

Next, whether or not a response to an input control command to the external host system is required is determined referring to com_reg[0] in step 320. When the external host system requests a response, the ICM 110 writes ACK or NAK to com_reg[5], and dumps the remaining part of the command. By doing so, the ICM 110 answers to the system in step 322. Also, according to a transmission command sent from the external host system, the ICM 110 checks the status of the encoder buffer 150 through the TSR 120. Then, the ICM 110 reads the encoded data and sends the data to the system.

Meanwhile, when it is determined, in the step 304, that the received data is not a control command, the ICM 110 checks the status of the decoder buffer 170 through the TSR 120, and then writes the transmitting data, that is, the encoded bit stream in step 324.

FIG. 4 is a flowchart for explaining a method for controlling encoding/decoding in the video codec system. When a start command is sent from the external host system, the video codec system makes the encoder and/or decoder perform respective tasks.

Referring to FIG. 4, with the start command, the ICM 110 makes the TSR 120 so that the encoder 140 and/or decoder 160 can be performed. That is, tsr[10] and/or tsr[11] are reset in step 400. Then, the encoder 140 and/or decoder 160 checks the corresponding bit, that is, tsr[10] and tsr[11], respectively, to determine whether or not performing encoding and/or decoding in step 410.

The encoder buffer 150 and decoder buffer 170 show their statuses in the corresponding bits of the TSR 120, that is, in one of tsr[0]~tsr[3] and one of tsr[4]~tsr[7], respectively, in step 420. Then, the ICM 110 controls the encoder 140 and decoder 160 through the CIR 130 based on the statuses of the encoder buffer 150 and decoder buffer 170 written in the TSR 120 in step 430.

For example, as for the encoder buffer 150, when tsr[0]=1, the ICM 110 raises the priority level of the encoder 140. When tsr[1]=1, the ICM 110 stops the operation of the encoder 140, and sets tsr[10] to '1', and tsr[14] to '1'. When tsr[2]=1, and when a predetermined time has not passed when tsr[0]=1, the ICM 110 lowers the priority level of the encoder 140. When a predetermined time has not passed when tsr[1]=1, the ICM 110 raises the priority level of the encoder 140. To control more precisely, tsr[3]=1 and tsr[7]=1 are determined by the designer, and handled in the same way as tsr[2]=1 and tsr[6]=1.

As for the decoder buffer 170, when tsr[4]=1, the ICM 110 stops the operation of the decoder 160 and sets tsr[11] to '1'. When tsr[5]=1, the decoder buffer 170 cannot be used and tsr[13] is set to '1'. When tsr[6]=1, and when a predetermined time has not passed when tsr[4]=1, the ICM 110 raises the priority level of the decoder 160. When a predetermined time has not passed when tsr[5]=1, the ICM 110 lowers the priority level of the decoder 160.

As a result, referring to the status of each buffer, the ICM 110 controls operations such as stop and start operations of the encoder 140 and decoder 160 so that each buffer is not in an empty or full status.

As described above, the present invention implements a video codec system in a processor independent from a multimedia communication system, and installs elements for effectively operating the encoder and decoder in the video codec system. Therefore, the present invention enhances the performance and reliability of the video code and make the control of the encoding and decoding tasks easier. Also, the video codec system according to the present invention has a structure for control which can be applied to H.261, H.263, MPEG-2, and MPEG-4.

What is claimed is:

1. An encoding/decoding control method in a video codec system which is implemented in a processor independent from a host system, the encoding/decoding control method comprising the steps of:
   (a) resetting pre-assigned bits of a task status register in the video codec system so that an encoder and/or decoder can operate when a start command is input from the host system;
   (b) determining whether or not to perform encoding and/or decoding, by checking a reset of the task status register in the encoder and/or decoder;
   (c) making pre-assigned bits of the task status register indicate buffer statuses of an encoder buffer and a decoder buffer; and
   (d) checking the buffer statuses of the encoder buffer and the decoder buffer written in the task status register, and then controlling tasks of the encoder and the decoder.

* * * * *